US010044820B2

(12) United States Patent
Doddavula et al.

(10) Patent No.: US 10,044,820 B2
(45) Date of Patent: Aug. 7, 2018

(54) METHOD AND SYSTEM FOR AUTOMATED TRANSACTION ANALYSIS

(71) Applicant: Infosys Limited, Bangalore (IN)

(72) Inventors: Shyam Kumar Doddavula, Bangalore (IN); Amit Gawande, Amravati (IN)

(73) Assignee: Infosys Limited, Bangalore (IN)

( * ) Notice: Subject to any disclaimer, the term of this patent is extended or adjusted under 35 U.S.C. 154(b) by 671 days.

(21) Appl. No.: 14/493,313

(22) Filed: Sep. 22, 2014

(65) Prior Publication Data

US 2015/0088959 A1   Mar. 26, 2015

(30) Foreign Application Priority Data

Sep. 23, 2013   (IN) .............. 4298/CHE/2013

(51) Int. Cl.
*H04L 29/08* (2006.01)
*H04L 12/26* (2006.01)
*G06F 11/34* (2006.01)

(52) U.S. Cl.
CPC .......... *H04L 67/22* (2013.01); *G06F 11/3438* (2013.01); *H04L 43/028* (2013.01); *H04L 67/02* (2013.01); *H04L 67/14* (2013.01)

(58) Field of Classification Search
CPC ..... H04L 43/028; H04L 67/22; G06F 11/3438
See application file for complete search history.

(56) References Cited

U.S. PATENT DOCUMENTS

| | | | | |
|---|---|---|---|---|
| 7,051,029 B1* | 5/2006 | Fayyad | ............ | G06F 17/30876 |
| 7,318,056 B2 | 1/2008 | Taniguchi et al. | | |
| 7,673,340 B1* | 3/2010 | Cohen | ................. | G06F 11/3438 |
| | | | | 379/266.08 |
| 9,203,905 B1* | 12/2015 | Hong | ...................... | H04L 67/14 |
| 2006/0015504 A1* | 1/2006 | Yu | ..................... | G06F 17/30864 |
| 2006/0212459 A1* | 9/2006 | Sugimura | .............. | G06Q 30/02 |
| 2012/0215787 A1 | 8/2012 | Pike et al. | | |

(Continued)

FOREIGN PATENT DOCUMENTS

| | | |
|---|---|---|
| EP | 1220098 A2 | 7/2002 |
| WO | 2011085497 A1 | 7/2011 |

OTHER PUBLICATIONS

Dionysios Logothetis et al., "In-situ MapReduce for Log Processing" UCSD Department of Computer Science.

(Continued)

*Primary Examiner* — Aaron Strange
(74) *Attorney, Agent, or Firm* — Klarquist Sparkman, LLP

(57) ABSTRACT

The present invention relates to a method and a system to automate identification of transactions. The method comprises receiving raw log files from a transaction device into a log collector, storing the raw log files to a log storage, processing the raw log files by a log parser unit to remove the fields and the entries of the raw log files that are not relevant for the transaction identification analysis, identifying of at least one session of at least one user by clustering the processed one or more entries from a single user session using at least one session identifier unit, identifying at least one user path that is followed by at least one user during a single user session, identifying at least one entry point from the identified single user path and determining at least one transaction and at least one sub transaction from the identified entry point.

20 Claims, 5 Drawing Sheets

(56) References Cited

U.S. PATENT DOCUMENTS

2012/0239558 A1    9/2012  Zhang
2012/0317200 A1   12/2012  Chan
2014/0068407 A1*  3/2014  Suh .................. G06F 17/30867
                                                          715/234

OTHER PUBLICATIONS

Jongwook Woo et al., "Market Basket Analysis Algorithm with Map/Reduce of Cloud Computing", Computer Information Systems Department, California State University.
Stephen Sorkin, "Large-Scale, Unstructured Data Retrieval and Analysis Using Splunk", Splunk Inc., San Francisco, CA, 2011.
Bingsheng He, "Mars: A MapReduce Framework on Graphics Processors", PACT'08, Oct. 25-29, 2008, Toronto, Ontario, Canada.
Spyros Blanas, "A Comparison of Join Algorithms for Log Processing in MapReduce", SIGMOD'10, Jun. 6-11, 2010, Indianapolis, Indiana, 2010.

* cited by examiner

⟵ Degree ⟶

| 2 | 3 | 4 |
|---|---|---|
| A1, A2 | A1, A2, A3 | A1, A2, A3, A4 |
| A2, A3 | A2, A3, A4 | A2, A3, A4, A5 |
| A3, A4 | A3, A4, A5 | |
| A4, A5 | | |

Path ⟶

FIG. 5

METHOD AND SYSTEM FOR AUTOMATED TRANSACTION ANALYSIS

RELATED APPLICATION DATA

This application claims priority to India Patent Application No. 4298/CHE/2013, filed Sep. 23, 2013, the disclosure of which is hereby incorporated by reference in its entirety.

FIELD OF THE INVENTION

The present invention relates to a method to automate identification of transactions where the user performs actions on more than one web page in a sequence for completing a business transaction.

Particularly, the present invention relates to a method and a system for automated transaction analysis where the analysis is from web log such that insights are derived at transaction level.

More particularly, the present invention relates to a system and a method for automated transaction analysis using MapReduce framework.

BACKGROUND

In any typical distributed application deployment, the web server(s) acts as the entry point for a web request coming from a client. Each web request that passes via the web server gets logged into the server logs as a log entry. So a web server log holds the entries for all the events that occur on the web server and thus on the applications. Each event entry provides information about a single request made to the web application. The entries help understand how the end user uses the application; in short the user behavior with the application.

Depending on the configuration settings at the web server, some or all of the standard fields are logged in the production web logs. The web servers in production then automatically log the requested fields for any and every event that is invoked by an end user.

MapReduce is a framework proposed by Google to process large sets of data by parallelizing the processing task across clusters of multiple computers. A problem at hand is decomposed into many small portions of work, map and reduce jobs. These jobs are passed on to any worker node in the cluster, a mapper or a reducer for processing.

A mapper accepts a set of key-value as input and applies a user defined map function to generate an intermediate key-value pair. The output from multiple mappers is grouped together and passed on to the reducer. A reducer merges the intermediate values belonging to the same intermediate key using the user defined reduce function.

So an underlying MapReduce implementation takes care of parallelizing and executing the programs on a large cluster of computer nodes.

Apache Hadoop is one such implementation of MapReduce framework. It allows distributed computing in reliable and scalable way. It follows master/slave architecture. The master, called as jobtracker, decomposes the job and passes them onto its slaves, called as tastrackers, for execution and re-execution.

To support such distributed computing over the data, it also provides a file system that itself can be distributed across multiple computer nodes, named as HDFS (Hadoop Distributed File System).

Analysis of user behavior in using web applications is important as it helps provide insights needed to improve customer satisfaction by providing better experience. Webservers provide logs that contain user behavior related information like the web pages user traversed, the time user spent in performing an action, the time spent in thinking and so on. Analyzing weblogs can therefore provide useful information about customer behavior.

With increasing use of internet, there are millions of users resulting in huge log files so there is a need for a scalable solution. Also there is a need to increase automation of the log analysis so that as web applications change, there is less human intervention needed.

There are solutions that analyze web logs and provide transaction analytics given transaction definitions. There are solutions that provide analytics at URL levels which can then be aggregated at Transaction level if the transaction definitions are provided.

The log analytics are typically performed at URL/page level by providing metrics, like page views, workload by status codes, response times etc., related to them. For any transaction level analysis, the transaction definition has to be provided by business where in they define the URL sequences. There are methodologies that can identify patterns in the URL sequences providing a map-like structure of the URL accesses.

The drawbacks of the above mentioned prior art is that for business to provide transaction definition, they need complete domain knowledge with thorough site map information. This level of information of all the available resources is most often not available with the business and the development teams do not have the necessary domain knowledge.

So there is chance of key transaction definitions not being provided and so critical information about them not identified. So what follows is the guesstimate to foresee the end-user behavior. This adds to the effort required and also the inaccuracies in the results extracted. The transaction definitions need to be updated whenever the web application is modified. So, the web log analysis can go out of synch with the web application if not updated periodically.

Thus there is a need to provide a way to auto-identify the probable transactions from the historical log data collected. This provides a mechanism to discover analytics at business transaction level that are identified using the actual user behavior rather than guesstimates.

The present disclosure proposes the usage of distributed file systems and MapReduce frameworks. This helps to reduce the resource requirements and the time consumed to perform the necessary algorithms, making the complete process efficient, and so feasible. The present disclosure method enables automation of transaction identification and transaction analytics. It improves on solutions with Transaction analytics by automating transaction identification from web logs.

The feature of the present invention lies in providing better solution for transaction identification from web logs using a method for automated web transaction identification from web logs and applies MapReduce framework to provide automated transaction analysis so that processing can be parallelized and completed faster

SUMMARY

According to one of the aspect of the present invention there is provided a method for automated transaction identification analysis. The method comprising receiving a plurality of raw log files from at least one transaction unit into one or more log collector unit and storing the plurality of raw log files to at least one log storage unit from the log collector unit, wherein the log storage unit comprises at least one distributed file system;

Processing the raw log file using at least one log parser unit to remove one or more log fields and one or more log entries from the raw log file that is not relevant for the transaction identification analysis to acquire one or more processed entries.

Identifying at least one session of at least one user by clustering the processed one or more entries from a single user session using at least one session identifier unit, such that the similar processed entries are clustered together to define a single user session.

Identifying at least one user path that is followed by at least one user during a single user session from the clustered similar user entries using a path analysis unit and determine the length of each user path during a user session; such that one or more independent frequency and one or more total frequency are processed from the identified user paths.

Identifying at least one entry point from the identified single user path, such that the entry point of the user path with the highest independent frequencies is defined as the entry point to the user path.

Determining at least one transaction and at least one sub transaction from the identified entry point using a transaction identifier to get a plurality of individual transactions, a plurality of complete transactions and a plurality of sub transactions with their corresponding key metrics.

According to another aspect of the present invention there is provided a system for automated transaction analysis. The system comprising a transaction device adapted to store a plurality of raw log files; a log collector operatively configured with the transaction device to collect the logs files from the transaction device.

At least one log storage operatively configured with the log collector, wherein the log storage comprises a distributed file system to store the raw log files.

At least one log parser operatively configured with the log storage to purge the raw logs files and get a plurality of processed entries.

At least one session identifier operatively configured with the log parser to identify a plurality of single user sessions and its associated metrics; wherein the similar processed entries are clustered together to define a single user session.

At least one path analyzer operatively configured with the session identifier to determine at least one path followed by the user during a single user session and its associated path metrics.

At least one transaction analyzer operatively connected with the path analyzer to identifying at least one entry point from the determined single user path.

At least one transaction identifier operatively connected with the transaction analyzer to identify transactions and sub transactions performed by the users from the identified entry point.

One of the objects of the present invention is to overcome the drawbacks of the prior art.

Another object of the present invention is to provide a System and Method for Automated Transaction Analysis Using MapReduce.

Yet another object of the present invention is to provide an system and a method for insights on user behavior at transaction level such that they can be used to perform application enhancements, personalized recommendations.

Yet another object of the present invention is to provide a solution that helps provide conceptualization and development of this solution requires application of skills, expertise, techniques and experience from multiple areas like big data technologies, high availability, application architecture, web analytics etc.

BRIEF DESCRIPTION OF THE DRAWINGS

FIG. 5 illustrates the possible paths with varying degree and user path.

DETAILED DESCRIPTION

Figure 1:
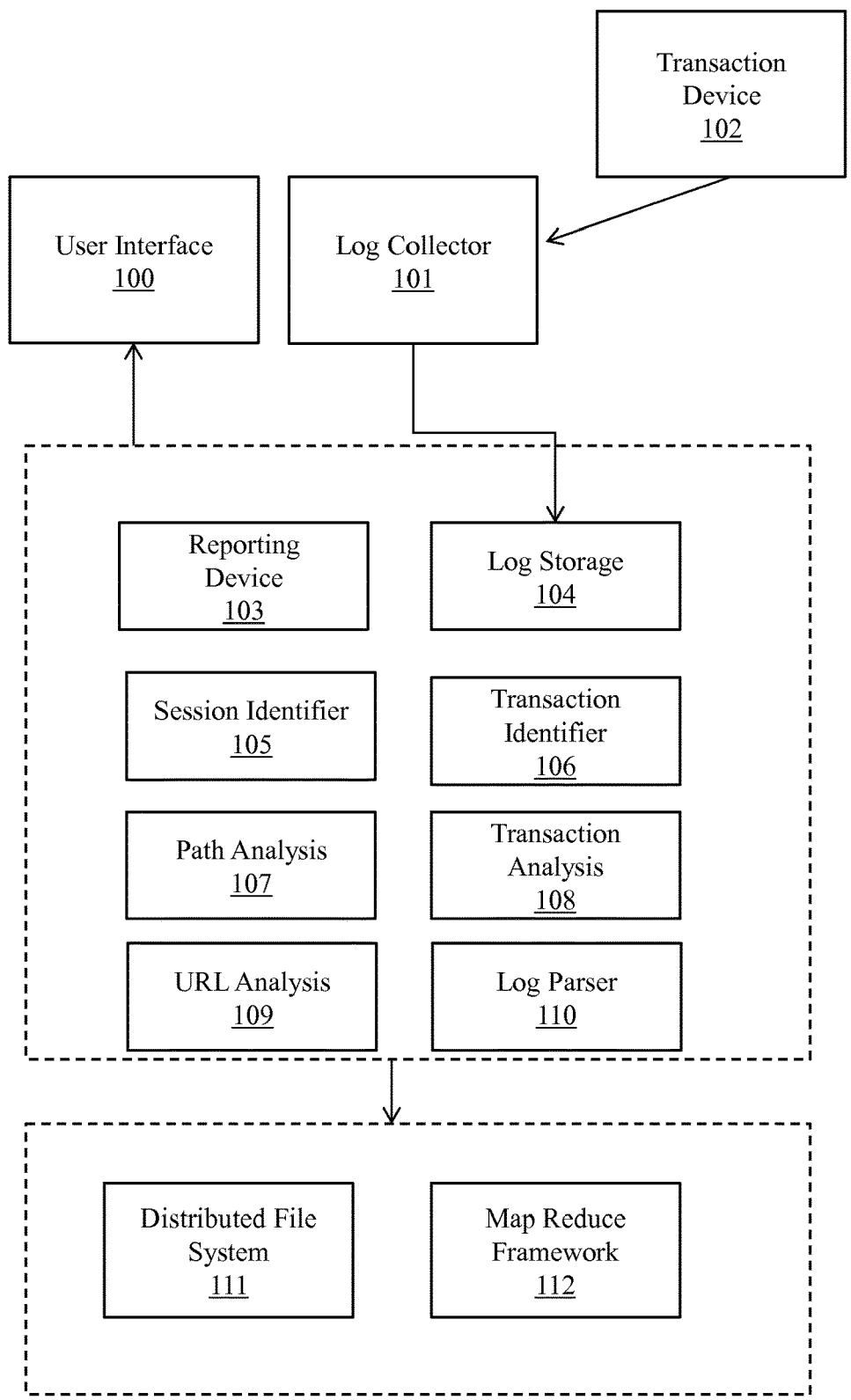
FIG. 1 illustrates the functional blocks of the system for automated transaction analysis.

FIG. 1 discloses the functional components of the proposed system. One or more log collectors 101 help collect the raw log files from the transaction device 102 and send them to the log storage component 104 which stores the raw log flies in a distributed file system 111. The log parser component 110 helps parse the raw log files and get processed entries.

The session identifier 105 gets the processed entries from the log parser helps identify user sessions using techniques like IP address of the client, sever side session management. The session identifier 105 also identifies the associated metrics of the user sessions as identified. The similar processed entries are clustered together to have a single user session. The URL analysis component 109 helps identify the associated metrics of the user session such metrics are the URL metrics like the start time, end time, bytes transferred and the like.

The path analysis component 107 helps determine the URL paths followed by a user during a session and also associated metrics like the number of times the path is followed, the time spent by the user following the path, the time user spent performing actions and the time spent thinking and the like.

The transaction identifier component 106 helps identify transactions performed by the users. The transaction analysis component 108 helps determine metrics associated with transaction like the number of times it was performed by different users, the time spent in performing the transactions, the entry and exit URLs.

The reporting component 103 helps create reports and present the insights calculated by the transaction analysis component 108. The user interface component 100 enables users to interact with this system to get transaction analysis results.

Figure 2:
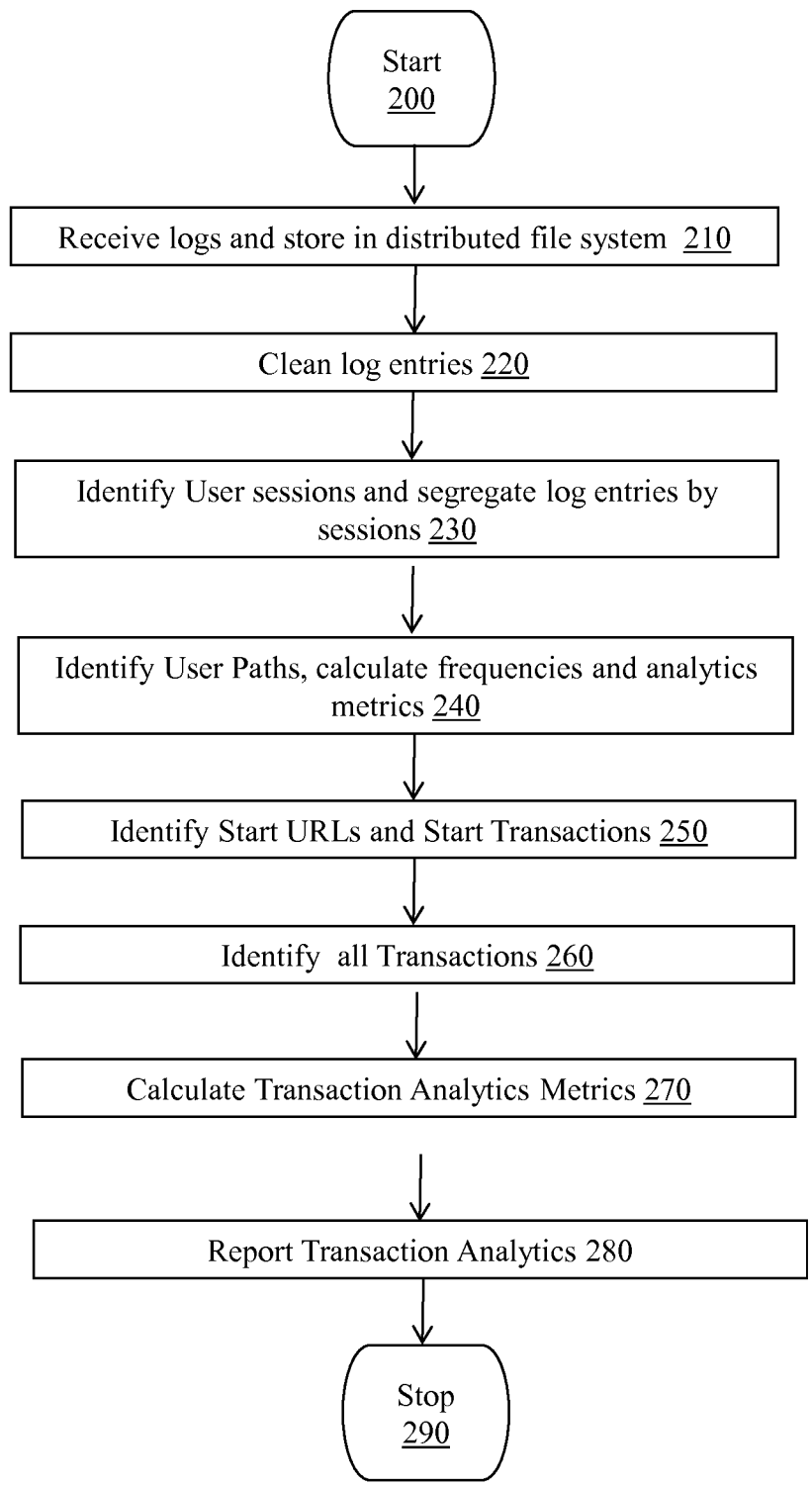
FIG. 2 illustrates the flowchart of the method steps of method for automated transaction analysis.

FIG. 2 discloses the flowchart describing the method steps for automated transaction identification analysis using MapReduce. The present disclosure proposes a method to identify probable business transactions based on the historical log entries where the below mentioned steps are involved.

Log aggregation and storage of raw log files in HDFS 210, pre-process filtering, cleanup of raw log files to get purged or processed log entries 220, user session level segregation to identify user sessions and segregate log entries by sessions 230, potential path identification to identify user paths, calculate frequencies and analytics metrics 240, entry points identification to identity start URLs and start transactions 250, transaction and sub-transaction tagging to identify all transactions 260, calculate transaction level analytics 270 and report transaction level analytics 280.

Each step of the above flowchart of FIG. 2 is discussed individually in the subsequent sections.

In the log aggregation and storage in HDFS step 210, one or more log collectors extract the raw log files from multiple log generators or also known as the transaction device, typically the web servers and pass them on to the log storage component. This component store the raw files in the distributed file system HDFS. The log generators themselves can also act as log collectors.

In the process filtering and cleanup step 220 before analyzing the logs for transaction definition, it is important to process the log files by removing the fields and the entries which are not relevant for the transaction identification process. Moreover all the entries have to be characterized based on the user information so that all the entries from a single user session are clustered together. This process is important as each user carries out a transaction independent of what the other user is doing during his session. So the entries pertaining to a single user session have to be considered while defining a transaction mutually exclusive of other user's actions.

The steps that would be carried out to derive the entries in required format are the use the HTTP response status codes to identify the entries which are valid for identifying transactions to get a list of accepted entries.

For example, entries with status codes 4xx represent user has erred while sending a request. Such entries are not to be considered as they represent invalid URLs. Typically the entries of type 2xx and 5xx are considered as valid entries which are received and accepted by the server. All the other entries can be discarded from the log files.

Next step that is carried out to derive the entries in required format, the entries are purged by removing details for all the fields that are not important for defining transactions. The unwanted fields in an entry which do not help in identifying the transaction. Examples of such fields are method, Win32 Status and Protocol Version fields.

The remaining entries are further purged to remove the entries for supporting resources like images, stylesheets, javascripts and the like. Similarly, the URI field can be further purged by removing the dynamic part of the sequence. This prevents same URL being tagged as unique because of changing dynamic part.

The process filtering and cleanup step 220 provides a list of all the processed entries that are cleaned for unwanted entries and information.

In the user session level segregation 230, the IP-address, cookie, user name or session information can be used to identify the same user entries. So all the entries are clustered by such fields in an application, whichever is present in a log file. Entries from a similar IP-address or a cookie or a user name would then be considered as URLs from a single user session. These clusters will be used going forward to identify unique URL sequences.

Figure 3:
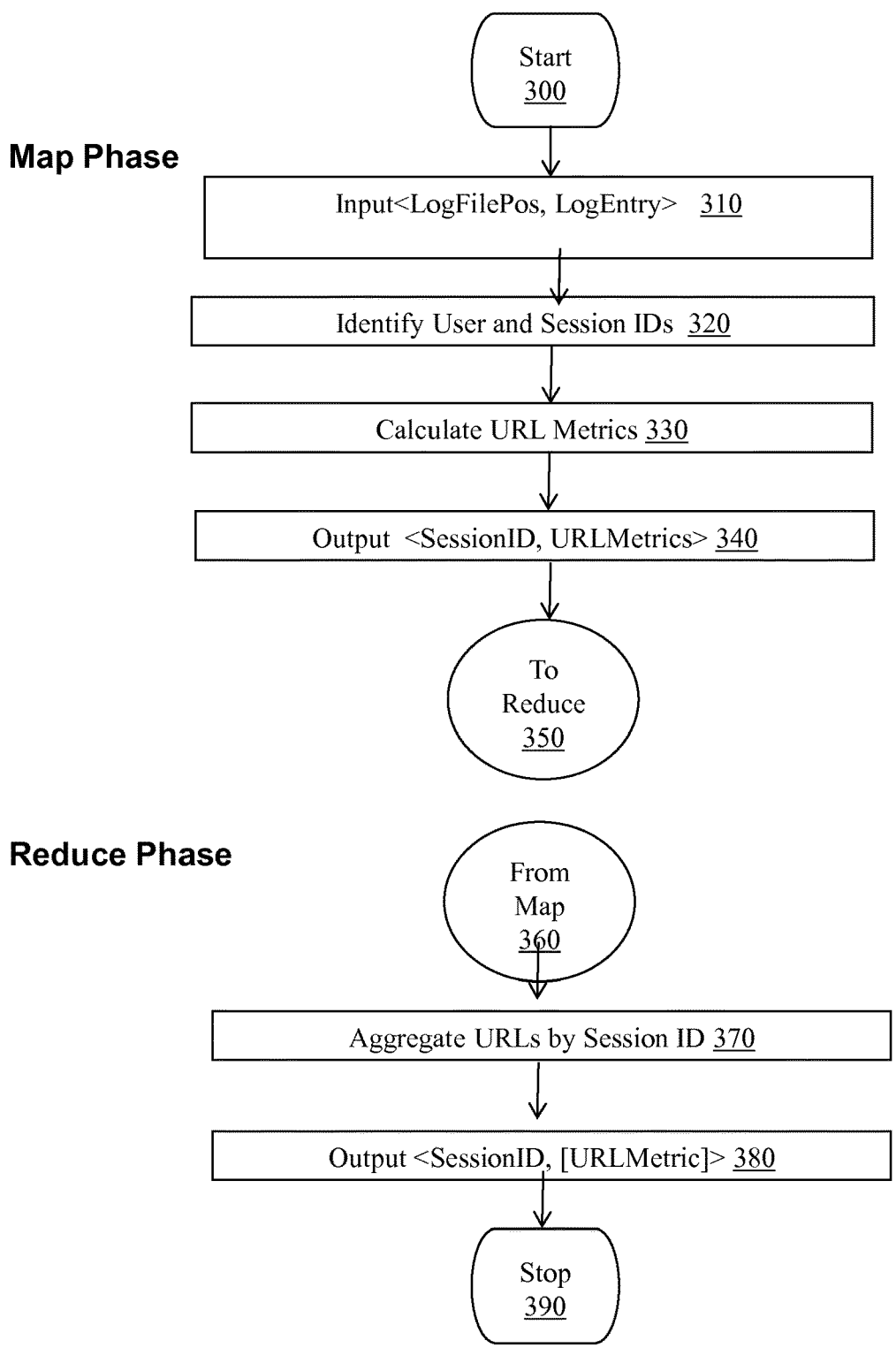
FIG. 3 illustrates the steps mentioned above about the segregation of URLs by user sessions can be performed using MapReduce.

FIG. 3 discloses the steps mentioned above about the segregation of URLs by user sessions can be performed using MapReduce 300. The Jobtracker node spawns multiple Map and reduce tasks to process the log files. These tasks are distributed and executed at the various data nodes which contain the blocks of the log files being processed. At map phase, a file block is read and converted into sets of key-value pairs denoted by <LogFilePos, Log Entry> where LogFilePos is the position of the log entry in the log and LogEntry is the log entry 310. A map function is defined to segregate the entries into different sessions using IP-address/session-IDs or usernames the map function parses the log entry using the LogParser component and identifies the user and session identifiers using the session identifier component 320. Various URL metrics like start time, end time, bytes are computed using the URLAnalysis component 330. Output is created as key-value pair of <SessionID, URL-Metrics> 340 which are then passed to the reduce phase 350.

The MapReduce framework aggregates all the URLMetric value objects by session ID and passes it to the reduce function 370 from map phase 360. The reduce function creates a final set of key-value pairs <sessionID, [URLMetrics]>, where [URLMetrics] is an array of the URLMetric objects with the sequence of URLs used in the session and the corresponding metrics 380.

The above steps result in a set of entries sorted and clubbed by user sessions. Each entry comprises of only the cleaned up and requisite fields.

Figure 4:
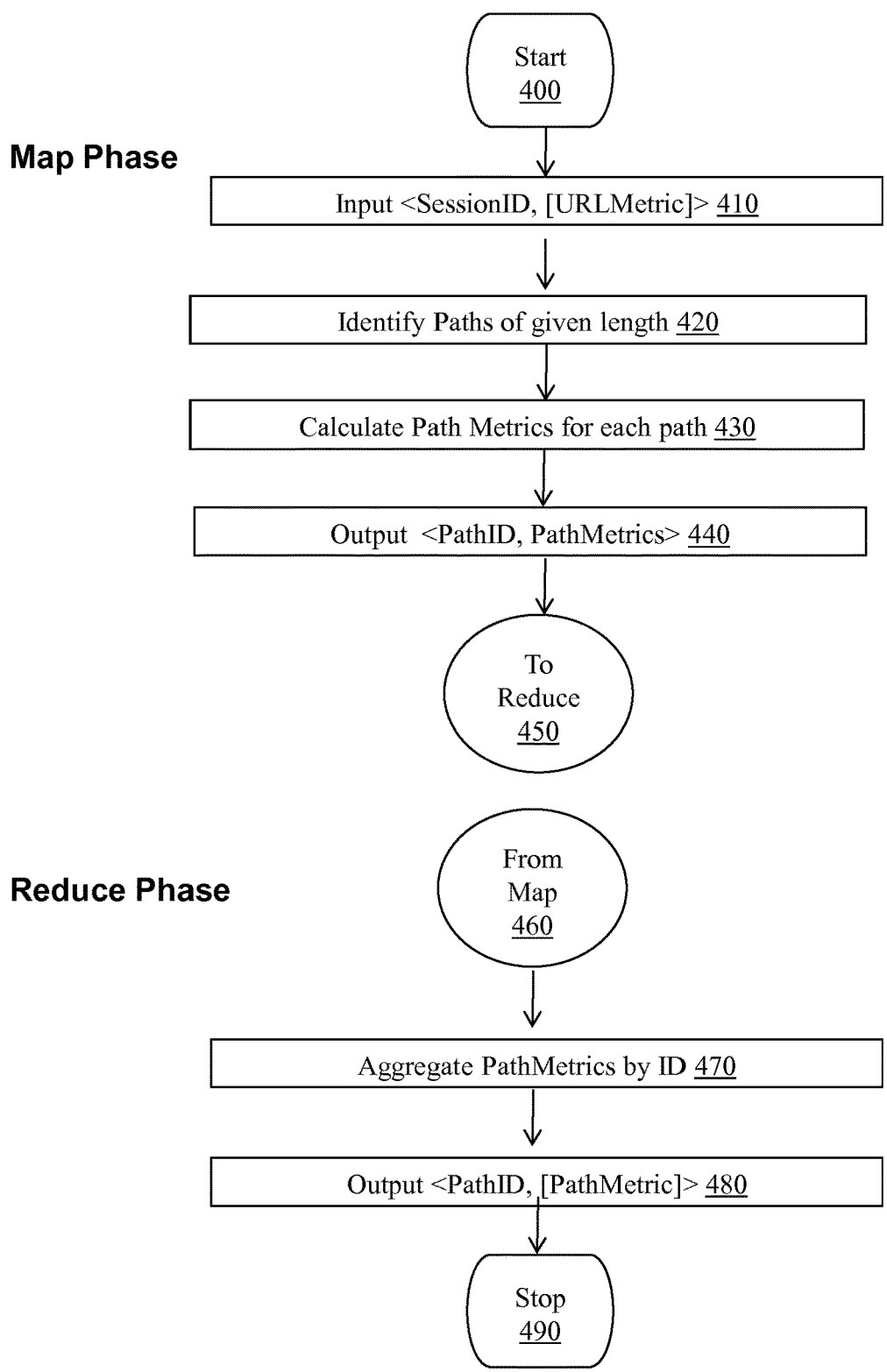
FIG. 4 illustrates the resultant set of key-value from User Session level Segregation act as a start point to define the possible paths with varying degree (the length of the path).

The potential paths identification as disclosed in FIG. 4 discloses the resultant set of key-value from user session level segregation act as a start point to define the possible paths with varying degree (the length of the path).

FIG. 4 discloses a map function 400 is defined that, starting with the first entry in every URL sequence [URLMetrics] for a single user session sessionID, uses sliding window mechanism to identify possible paths within minimum and maximum length threshold. The related path metrics are also calculated.

The jobtracker takes the output <sessionID>, [URLMetrics] from previous job and passes it on to map functions 410. The map function uses the PathAnalysis component to identify the various paths and associated metrics like path time, think time etc 420. The output is a key-value pair <pathID, PathMetric>. Here pathID is the unique id assigned to the identified path derived from the URLs that are part of the path and PathMetric is the object that comprises of URLSeq, a sequence of URL in this path, and the associated path analytic metrics, one key metric being the frequency (the count of occurrence of a particular path). In the map function the frequency of each path processed is set to 1. The <PathID, PathMetric> key-value pairs are then sent to the reduce phase. In the reduce phase the MapReduce framework aggregates the PathMetric value objects for each key value of PathID and the aggregated collection to the reduce function. In the reduce function the metrics are aggregated like the total frequency of a path indicating how many times users followed the URL path, independent frequency, which is the number of times users followed this path uniquely etc.

For example, for a single user session say the URL sequence is as follows: A1, A2, A3, A4, A5. The possible paths will be as disclosed in FIG. 5.

So at the end of a map and reduce job execution what we get is the set of pathIDs, a unique representation as URLs involved (like A1_A2 etc.) and the associated metrics for that PathID. The key metrics calculated, but not limited to, are average time required to complete the path (difference between start and end times), frequency of the pathID (number of times the path is followed) and the independent frequency.

The independent frequency is found out by discarding the counts for overlays of the path in the paths with higher frequencies. For example in above example, the path [A1, A2] is part of two other paths [A1, A2, A3] and [A1, A2, A3, A4]. So the independent frequency of the path [A1, A2] would be calculated by removing the counts of [A1, A2, A3]

and [A1, A2, A3, A4]. Once independent count is calculated, a path's independent frequency percentage value in respect to its total frequency is also calculated.

In the entry points identification 250 the next the probable entry points to the paths are identified. The key idea here is the start points of the paths with highest independent frequency can be probable candidates for entry points. To find out a list of entry points certain steps are followed.

Filtering the complete list of paths for the ones that have independent frequency percentages as 100. These paths represent the ones which do not overlap with any other paths and are carried out independently by the end users.

Sorting the list generated as an output from [0068] by independent frequency count and note the start points i.e. first URL entry of the urlSeq object, of the sorted list.

Starting with the first path in the list, modify the urlSeq of the current path by discarding the entries which cycle back to the identified start points.

Recalculating the degrees of the path and discard the paths whose degree falls below the minimum degree threshold. Also remove the entry from the entry point list.

Repeating the step of [0070] and of [0071] till all the paths are processed.

At the end of [0073], a list of all the probable entry points which then can be used to tag all the transactions and sub-transactions.

The transaction and sub-transaction tagging 260 where the ends points identified provide an insight of what can be probable transactions. However, the log entries also include the sequences which do not represent a complete transaction.

For example, a transaction A1, A2 might not be a transaction if there is already a defined transaction A1, A2, A3. Such sequences are tagged as sub-transactions. The using the entry-points, total frequency and individual frequency to tag all the URL sequences as transactions and sub-transactions. The following steps are involved:

Modifying the paths by discarding the sub-paths which have a reference back to an entry point. Such sub-path represent user intended to start a new transaction, by ending the current browsing sequence.

For example say A3 is an entry point as identified in step 2.5. Then a path A1, A2, A3, A4, A5 will be modified to A1, A2 by discarding the complete sub-path A3, A4, A5 as it points back to the entry point A3.

Discarding all the paths that have a modified degree below the minimum degree threshold.

Identifying all paths in the modified paths list that do not overlay with any other path. Tag all such transactions as paths Identifying all the paths which overlay with the transactions identified above. Tag these paths as their sub-transactions.

At the end of the above steps, a list of all the individual, complete transactions and their sub-transactions along with key metrics associated with them are found.

Calculating and reporting of transaction level analytics 270 and 280 are performed once all the transactions are identified, key analytics is calculated for them by using the key fields logged in the log files. This step can be done as part of the identification itself or performed once all the transactions are identified.

The key analytics that are found out and reported are mentioned, and not limited to, below:

Average time taken to complete a transaction: Such metric provides information about if the users are completing the transactions in stipulated time or are spending too much time. This information is used to identify the improvements necessary for speeding the user interaction.

Percentage of the transaction completions and drop-outs: Such metric provides insight into whether users are dropping off before completing a transaction, indicating a pattern in user behavior. Again, this information is used to identify the issues or struggles at user level and its effects on business.

Sub-transactions and their percentages: Such metric provides information on what are the key sub-paths the users follow. The frequencies of transactions and sub-transactions are also calculated

What is claimed is:

1. In a computing system comprising one or more hardware processors coupled to one or more computer-readable medium, a method for automated transaction identification analysis, the method comprising:
   receiving a plurality of raw log files from a distributed file system, the plurality of raw log files being associated with a plurality of user sessions of a plurality of users;
   storing the plurality of raw log files in at least one distributed file system;
   processing, with at least one of the one or more hardware processors, the plurality of raw log files to remove one or more log fields and one or more log entries from the plurality of raw log files;
   in parallel, with a distributed, parallel processing framework comprising a first plurality of computing nodes:
      in a first mapping stage comprising a plurality of mapping functions:
         segregating single user sessions of the plurality of users by clustering one or more log entries of the plurality of processed raw log files from a single user session, wherein processed log entries of the plurality of processed raw log files having at least one session identifier with defined degree of similarity are clustered together to define single user sessions; and
         for each single user session, calculating URL statistics;
      in a first reduce stage:
         aggregating URLs by single user session; and
         outputting key value tuples comprising an identifier for a single user session and an array, stored in memory accessible by the one or more hardware processors, of URL metric data objects for respective single user sessions;
      in a second mapping stage, with the output of the first reduce stage:
         for the plurality of segregated single user sessions, identifying at least one user path that is followed by an associated at least one user of the plurality of users during a single user session of the plurality of segregated single user sessions; and
         determining a length of each identified user path during a segregated single user session, the length comprising a plurality of URLs associated with the segregated single user session;
      in a second reduce stage, outputting key value tuples comprising path identifiers for identified user paths and path metric value objects for respective path identifiers;
   determining an independent frequency and a total frequency associated with the identified at least one user path;
   for a plurality of identified user paths, identifying at least one entry point for a single user path of the plurality of identified user paths, wherein a start point of a user path with the highest independent frequencies is defined as the entry point to the user path;
for the plurality of segregated user sessions, determining a plurality of transactions and a plurality of sub-transactions from the identified entry points using at least one transaction identifier; and
tagging paths of the identified user paths corresponding to transactions or sub-transactions as transactions or sub-transactions, respectively, wherein the tagged paths are useable to perform application enhancements or provide personalized recommendations.

2. The method of claim 1 wherein the at least one session identifier comprises an IP-address, a cookie, or a user name.

3. The method of claim 1 wherein the entries from IP-addresses cookies, user names, or session information having a defined degree of similarity are defined as one or more URL from a single user session.

4. The method of claim 1 wherein clustering the one or more log entries comprises using IP-addresses, cookies, user names, or session information having a defined degree of similarity to define one or more URL sequences from a single user session.

5. The method of claim 1 wherein processing the plurality of raw log files comprises:
identifying log entries of the processed raw log files using Hypertext Transfer Protocol (HTTP) response status codes, wherein the log entries of the processed raw log files matching one or more status codes are accepted entries and log entries not matching the one or more status codes are rejected entries, the rejected entries being discarded; and
purging the accepted entries to remove details for one or more log fields.

6. The method of claim 5, further comprising purging supporting resources from the accepted entries.

7. The method of claim 5, further comprising purging a uniform resource identifier (URI) field of an accepted log entry by removing a dynamic part of a field value of the URI field.

8. The method of claim 1 wherein segregating single user sessions is implemented using a distributed, parallel processing framework.

9. The method of claim 8 wherein segregating single user sessions using a distributed, parallel processing framework comprises:
evaluating at least one processed raw log file and converting it into a plurality of log pairs,
wherein the plurality of log pairs comprise a position of the log entry in the processed raw log file and a log entry;
computing a plurality of URL metrics values from the clustered segregated single user sessions; and
outputting a plurality of URL pairs, wherein the URL pairs comprise one or more URL metric values and a session ID.

10. The method of claim 9 wherein the one or more URL metrics comprise an array of URL metric objects with a sequence of URLs a segregated single session and corresponding metrics of the metric objects.

11. The method of claim 1 wherein identifying at least one user path is implemented using a distributed, parallel processing framework.

12. The method of claim 11, further comprising:
associating a plurality of identified user paths and their associated path metrics to get a plurality of path pairs, the plurality of path pairs comprising a path ID and a path metric;
setting a frequency of each associated user path to 1;
aggregating path metric values of the path metrics of the identified user paths by path ID;
wherein the path metrics are aggregated to calculate a total frequency of a user path, indicating a number of times users of the plurality of users followed the path and to calculate an independent frequency, indicating a number of times users of the plurality of users followed the path uniquely.

13. The method of claim 12 wherein the path ID is a unique ID assigned to the identified path derived from the URLs that are part of the path associated with the path ID.

14. The method of claim 13 wherein the independent frequency is calculated by discarding counts for overlays of the identified path in user-paths with higher frequency.

15. The method of claim 1 wherein identifying at least one entry point comprises:
filtering the plurality of identified user paths to provide one or more filtered use paths having predefined independent frequency percentages, wherein the one or more filtered user paths do not overlap with any other paths and are carried out independently by the users;
sorting the one or more filtered user paths by independent frequency count and noting start points;
with a first path in a list, modify a URL sequence of the first path by discarding log entries which cycle back to the noted start points; wherein a noted start point is a first URL entry of the URL sequence; and
calculating degrees of at least a portion of the filtered user paths and discarding filtered user paths whose degree falls below a minimum degree threshold and removing an associated entry point from an entry point list.

16. The method of claim 1 wherein determining a plurality of transaction and sub-transactions comprises:
modifying the identified user paths by discarding sub-paths having a position back to an entry point, wherein the discarded sub-paths represent a user intending to start a new transaction by ending a current browsing sequence;
discarding identified user paths having a degree below a minimum degree threshold;
identifying all paths in a modified path list that do not overlay with any other path of the modified path list and tagging such paths as tagged paths corresponding to transactions;
identifying paths of the modified path list which overlay a tagged path; and
tagging the overlaid paths as sub-transaction.

17. A system for automated transaction analysis, the system comprising one or more hardware processors and one or more computable readable medium coupled to the one or more hardware processors, the one or more computer readable medium comprising instructions that, when executed on the one or more hardware processors, carry out a method comprising:
storing a plurality of raw log files in a distributed file system;
collecting the plurality of raw logs files from a transaction device;
purging the raw log files, using the one or more hardware processors, to obtain a plurality of processed log files;
in parallel, with a distributed, parallel processing framework comprising a first plurality of computing nodes:
spawning a first plurality of parallel processing tasks;
distributing the first plurality of parallel processing tasks to a second plurality of computing nodes selected from the first plurality of computing nodes, the second plurality of computing nodes comprising processed log files corresponding to a processing task of the first plurality of processing tasks;

in a first mapping stage comprising a plurality of mapping functions:

calling a first mapping function, the first mapping function reading a file block of a processed log file to provide a output comprising sets of key-value tuples comprising a log file position and a log entry corresponding to the log file position;

calling a second mapping function, the second mapping function segregating single user sessions of the plurality of users by clustering one or more log entries of the plurality of processed raw log files from a single user session, wherein processed log entries of the plurality of processed raw log files having at least one session identifier with defined degree of similarity are clustered together to define single user sessions; and for each single user session, calculating URL statistics;

spawning a second plurality of parallel processing tasks;

distributing the second plurality of parallel processing tasks to a third plurality of computing nodes selected from the first plurality of computing nodes;

in a first reduce stage:

calling a first reduce function, the first reduce function aggregating URLs by single user session; and calling a second reduce function, the second reduce function outputting key value tuples comprising an identifier for a single user session and an array, stored in memory accessible by the one or more hardware processors, of URL metric data objects for respective single user sessions;

spawning a third plurality of parallel processing tasks;

distributing the third plurality of parallel processing tasks to a fourth plurality of computing nodes selected from the first plurality of computing nodes;

in a second mapping stage, with the output of the first reduce stage:

calling a third mapping function, for the plurality of segregated single user sessions, the third mapping function identifying at least one user path that is followed by an associated at least one user of the plurality of users during a single user session of the plurality of segregated single user sessions; and calling a fourth mapping function, the fourth mapping function determining a length of each identified user path during a segregated single user session, the length comprising a plurality of URLs associated with the segregated single user session;

spawning a fourth plurality of parallel processing tasks;

distributing the fourth plurality of parallel processing tasks to a fifth plurality of computing nodes selected from the first plurality of computing nodes; and in a second reduce stage, calling a third reduce function, the third reduce function outputting key value pairs comprising path identifiers for identified user paths and path metric value objects for respective path identifiers;

determining an independent frequency and a total frequency associated with the identified at least one user path;

for a plurality of identified user paths, identifying at least one entry point for a single user path of the plurality of identified user paths, wherein a start point of a user path with the highest independent frequencies is defined as the entry point to the user path; and for the plurality of segregated user sessions, determining a plurality of transactions and a plurality of sub-transactions from the identified entry points using at least one transaction identifier.

18. One or more non-transitory computer readable medium comprising instructions that, when executed on one or more processors, perform operations for:

receiving a plurality of log files, the plurality of log files being associated with a plurality of user sessions of a plurality of users;

storing the plurality of log files in at least one distributed file system;

in parallel, with a distributed, parallel processing framework comprising a first plurality of computing nodes:

in a first mapping stage comprising a plurality of mapping functions:

segregating single user sessions of the plurality of users by clustering one or more log entries of the plurality of log files from a single user session, wherein processed log entries of the plurality of log files having at least one session identifier with a defined degree of similarity are clustered together to define single user sessions; and for each single user session, calculating URL statistics;

in a first reduce stage:

aggregating URLs by single user session; and outputting key value tuples comprising an identifier for a single user session and an array, stored in memory accessible by the one or more processors, of URL metric data objects for respective single user sessions;

in a second mapping stage, with the output of the first reduce stage:

for the plurality of segregated single user sessions, with the one or more processors, identifying at least one user path that is followed by an associated at least one user of the plurality of users during a single user session of the plurality of segregated single user sessions; and determining a length of each identified user path during a segregated single user session, the length comprising a plurality of URLs associated with the segregated single user session;

in a second reduce stage, outputting key value tuples comprising path identifiers for identified user paths and path metric value objects for respective path identifiers;

determining an independent frequency and a total frequency associated with the identified at least one user path;

for a plurality of identified user paths, with the one or more processors, identifying at least one entry point for a single user path of the plurality of identified user paths, wherein a start point of a user path with the highest independent frequencies is defined as the entry point to the user path; and for the plurality of segregated user sessions, determining a plurality of transactions and a plurality of sub-transactions from the identified entry points using at least one transaction identifier; and tagging paths of the identified user paths corresponding to transactions or sub-transactions as transactions or sub-transactions, respectively, wherein the tagged paths are useable to perform application enhancements or provide personalized recommendations.

19. The one or more non-transitory computer readable medium of claim 18, wherein the at least one session identifier comprises an IP-address, a cookie, or a user name.

20. The one or more non-transitory computer readable medium of claim 18, wherein the entries from IP-addresses cookies, user names, or session information having a defined degree of similarity are defined as one or more URL from a single user session.

* * * * *